(12) United States Patent
Yumitori et al.

(10) Patent No.: US 6,912,723 B2
(45) Date of Patent: Jun. 28, 2005

(54) DISC DRIVE FOR PLAYING INFORMATION RECORDED ON AN OPTICAL DISC

(75) Inventors: Hiroaki Yumitori, Kanagawa (JP); Akio Saito, Kanagawa (JP); Hitoshi Furuya, Kanagawa (JP)

(73) Assignee: Mitsumi Electric Co., Ltd., Kanagawa (JP)

( * ) Notice: Subject to any disclaimer, the term of this patent is extended or adjusted under 35 U.S.C. 154(b) by 187 days.

(21) Appl. No.: 10/397,145

(22) Filed: Mar. 26, 2003

(65) Prior Publication Data

US 2003/0218958 A1 Nov. 27, 2003

(30) Foreign Application Priority Data

Mar. 26, 2002 (JP) .................................... 2002-086583

(51) Int. Cl.[7] .............................................. G11B 21/02
(52) U.S. Cl. ...................... 720/692; 720/605; 720/690
(58) Field of Search ..................... 720/672, 690–692, 720/601, 604, 605

(56) References Cited

U.S. PATENT DOCUMENTS

| | | | | | |
|---|---|---|---|---|---|
| 5,621,718 | A | * | 4/1997 | Leung | 720/663 |
| 5,737,304 | A | * | 4/1998 | Soga et al. | 720/692 |
| 2003/0076773 | A1 | * | 4/2003 | Moriyama et al. | 369/263 |
| 2003/0235141 | A1 | * | 12/2003 | Ohta | 369/244 |

* cited by examiner

*Primary Examiner*—Brian E. Miller
(74) *Attorney, Agent, or Firm*—Patents & TMS, P.C.

(57) ABSTRACT

A disc drive includes a main body, a disc tray movable with respect to the main body between a loading position for loading an optical disc and an eject position, and a chassis on which a rotational drive mechanism for rotating a loaded optical disc is provided. The chassis is pivotally provided with respect to the main body about a pivotal axis near the rear end of the chassis so that the front end thereof can be displaced between a lowered position when the disc tray is ejected and a raised position for placing the optical disc on the rotational drive mechanism when rotating the optical disc. The disc drive prevents the chassis and/or the optical disc rotational drive mechanism from interfering or colliding with other elements of the disc drive.

8 Claims, 9 Drawing Sheets

DISC DRIVE FOR PLAYING INFORMATION RECORDED ON AN OPTICAL DISC

BACKGROUND OF THE INVENTION

1. Field of the Invention

The present invention is related to a disc drive.

2. Description of the Prior Art

There are various disc drives which playback or record/playback optical discs such as a CD-ROM, CD-R, DVD and the like These disc drives include a box-shaped main body, a disc tray which is movable between a position for loading an optical disc in the main body and a position for ejecting the optical disc, and a sled mechanism unit provided inside the main body. The sled mechanism unit is constructed from an optical disc rotational drive mechanism which rotates a loaded optical disc, an optical pickup (optical head), and an optical pickup moving mechanism which moves the optical pickup in a radial direction of the optical disc, and all these elements are arranged on a chassis.

The sled mechanism unit is provided in a manner that enables pivotal movement about an axis around the vicinity of the rear end portion thereof with respect to the main body. When the disc tray is ejected, the front portion of the sled mechanism unit is rotated downward so that the sled mechanism unit does not interfere with the disc tray being moved to the ejection position, and this forms an inclined posture (lowered position) with respect to the main body.

In these disc drives, if a downward force acts on the sled mechanism unit due to a shock such as the disc drive being dropped or the like in the disc tray ejection state, the front end of the sled mechanism unit at the lowered position is forced even lower. When such an accident is happened, there is the risk that the sled mechanism unit will collide with other elements and cause damage thereto, or the sled mechanism unit itself will become damaged by collision with the bottom portion of the main body. In order to avoid such problems, in the prior art, a protruding stopper was formed on the undersurface of the front end portion of the chassis of the sled mechanism unit so that when the sled mechanism unit is at the lowered position, this stopper makes contact with the bottom portion of the main body.

The prior art disc drive having the above stopper prevents the front end portion of the sled mechanism unit from being lowered during shocks. However, in the case where such prior art structure receives a relatively strong shock, the stopper becomes a support point which enables the rear end portion of the sled mechanism unit to be lowered. The lowered rear end portion will collide with the main circuit substrate provided on the underside of the sled mechanism unit, so that there is the risk that the main circuit substrate will be damaged.

SUMMARY OF THE INVENTION

Accordingly, it is an object of the present invention to provide a disc drive which can prevent the chassis on which the optical disc rotational drive mechanism is arranged from colliding with other elements even when the disc drive receives a shock while the disc tray is in an ejected state.

In order to achieve the object, there present invention is directed to a disc drive for playing back information recorded in an optical disc. The disc drive comprises a main body having a bottom portion; a disc tray which is movable with respect to the main body between a loading position for loading an optical disc and an eject position; a chassis on which a rotational drive mechanism for rotating a loaded optical disc is provided, the chassis having front and rear ends and an undersurface, and the chassis being pivotally provided with respect to the main body about a pivotal axis near the rear end of the chassis so that the front end thereof can be displaced between a lowered position when the disc tray is ejected and a raised position for placing the optical disc on the rotational drive mechanism when rotating the optical disc; and first and second stopper means provided on the undersurface of the chassis so as to protrude therefrom, the fist stopper means being arranged at a position near the front end of the chassis and the second stopper means being arranged at a position between the front end and the rear end of the chassis, and the first and second stopper means being adapted to make contact with the bottom portion of the main body when the chassis is in the lowered position.

In the present invention, it is preferred that the second stopper means is provided at a roughly middle position between the front and rear ends of the chassis Further, it is also preferred that each of the first and second stopper means includes a pair of stoppers.

Preferably, the disc drive of the present invention further comprises a main circuit substrate having a circuit for controlling various operations of the disc drive, the main circuit substrate being positioned on the underside of the chassis at a position near the rear end away from the second stopper means.

Preferably, the disc drive of the present invention further comprises a frame member provided in the main body so as to surround the outer periphery of the chassis, and the frame member being pivotally displaceable with respect to the main body, in which the chassis is supported by the frame member through elastic members.

Further, in the present invention, it is preferred that the length of the second stopper means is longer than the length of the first stopper means.

Furthermore, it is also preferred that the chassis includes a plate-shaped chassis base, and the first and second stoppers being formed with the chassis base by outsert molding.

Moreover, it is also preferred that one of the first stoppers and one of the second stoppers are integrally formed on one outsert molded member, and another of the first stoppers and another of the second stoppers are integrally formed on another outsert molded member.

The above and other objects, structures and advantages of the present invention will be more apparent when the following detailed description of the embodiments is considered in conjunction with the accompanied drawings.

DETAILED DESCRIPTION OF THE PREFERRED EMBODIMENTS

The preferred embodiment of a disc drive according to the present invention will now be described in detail with reference to the appended drawings.

Figure 1:
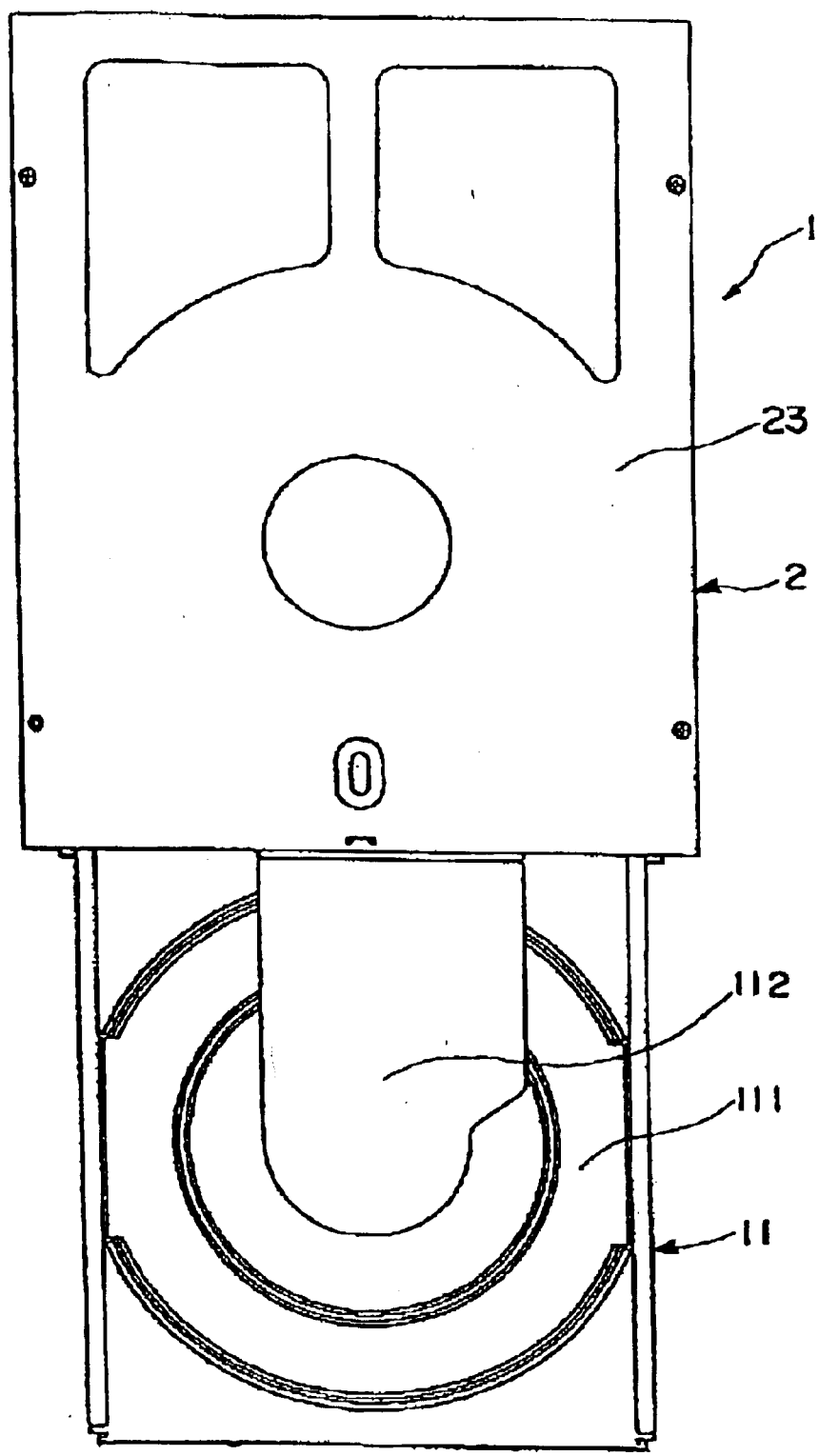
FIG. 1 is a plan view of an embodiment of a disc drive according to the present invention.
Figure 2:
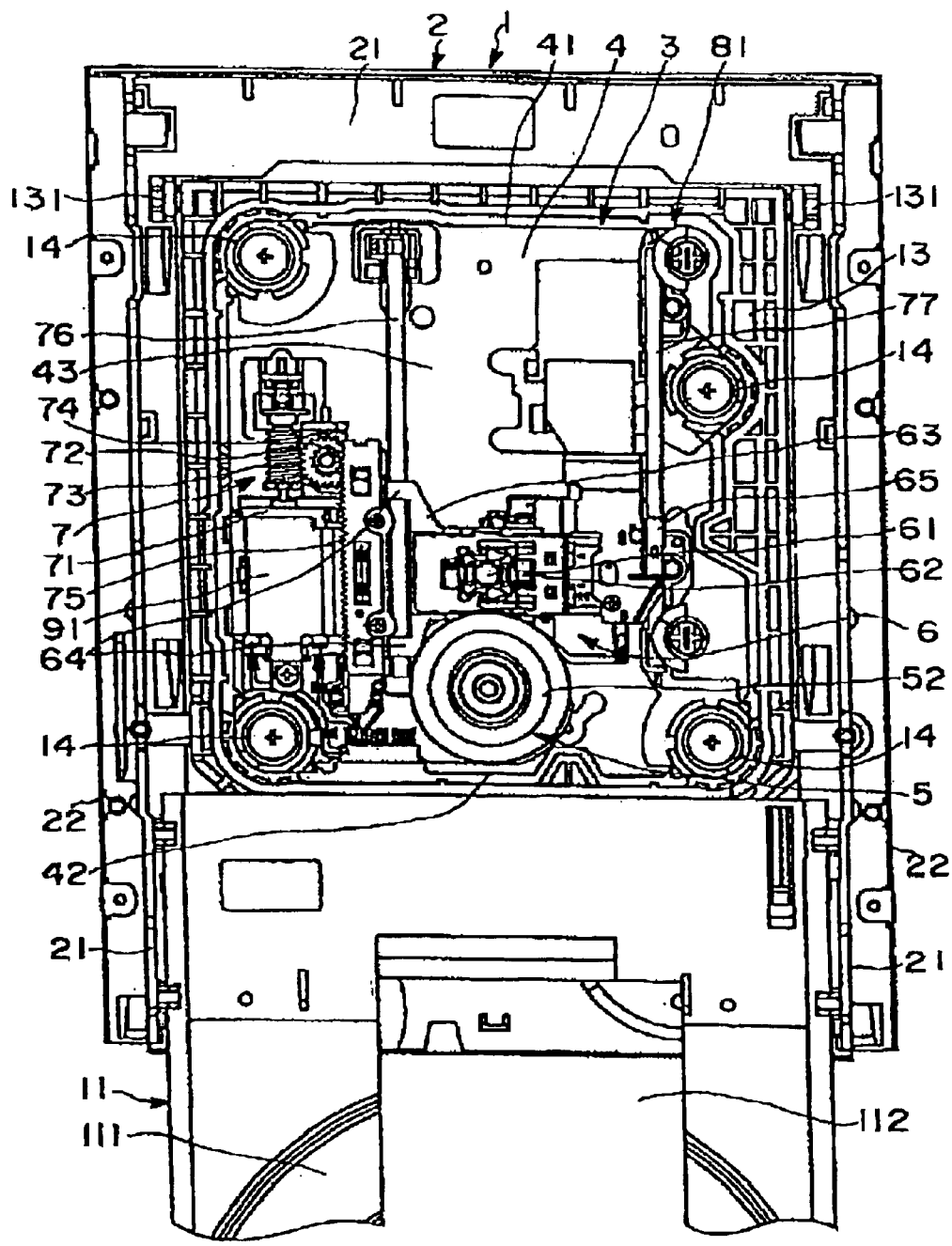
FIG. 2 is a plan view showing the disc drive of FIG. 1 in a state where the top plate has been removed.
Figure 3:
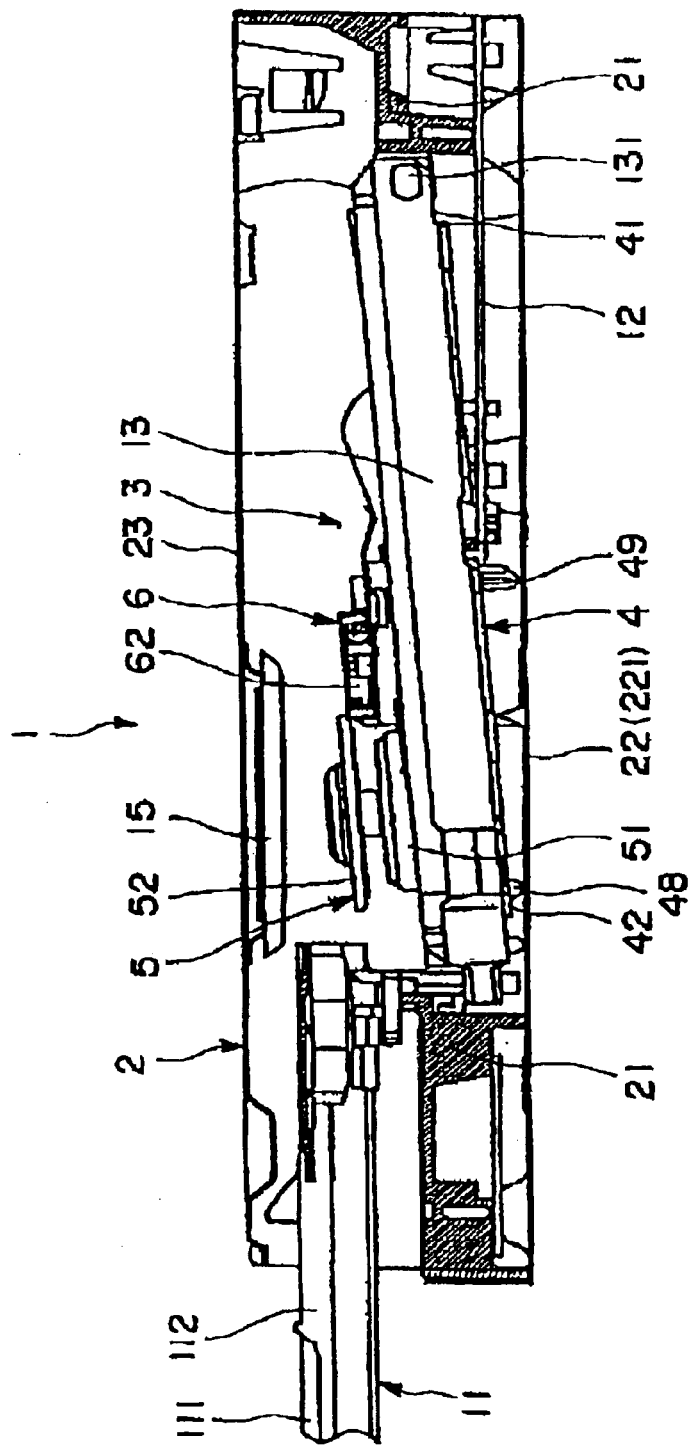
FIG. 3 is a cross-sectional view of the disc drive shown in FIG. 1.
Figure 4:
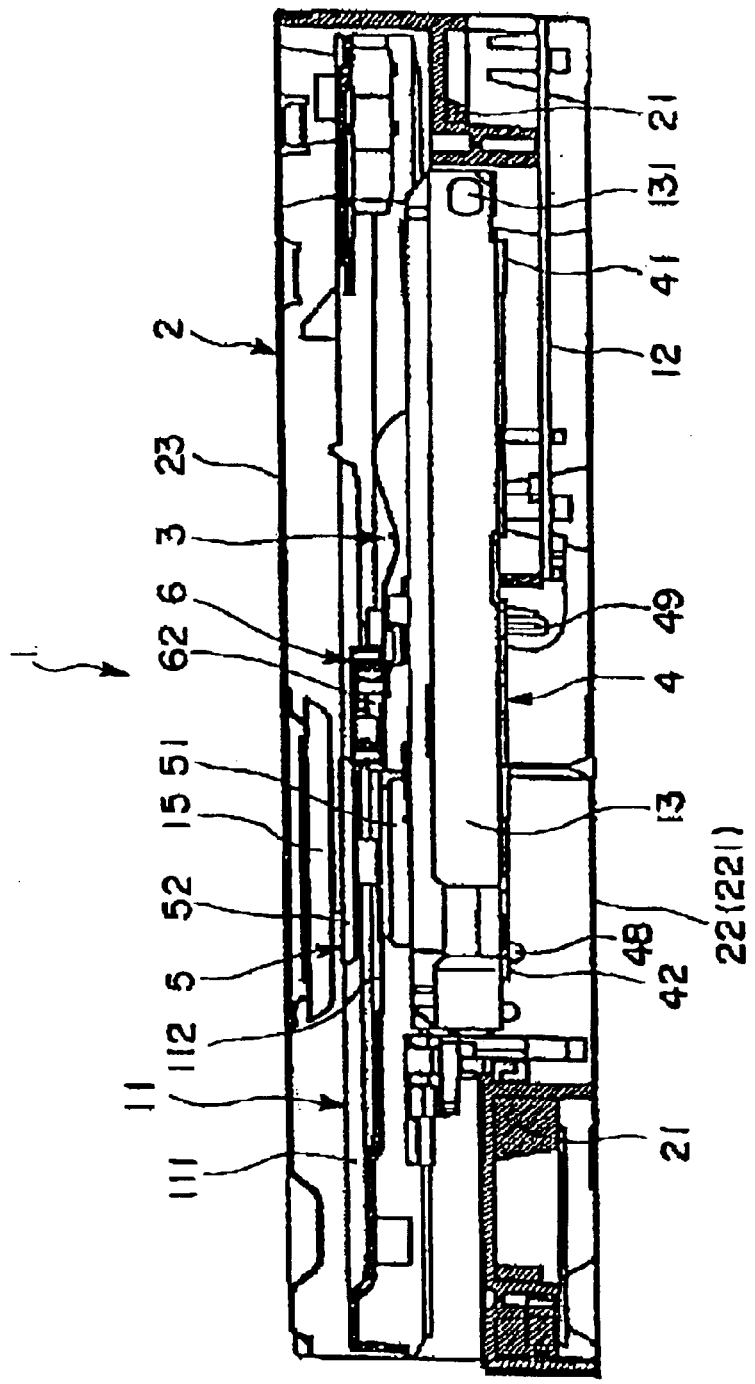
FIG. 4 is another cross-sectional view of the disc drive shown in FIG. 1.

For convenience, the upward direction in FIG. 1 and FIG. 2 and the rightward direction in FIG. 3 and FIG. 4 is referred to as "back" or the "backward" and the downward direction in FIG. 1 and FIG. 2 and the leftward direction in FIG. 3 and FIG. 4 is referred to as "forward" or the "forward direction".

A disc drive 1 shown in these drawings has a playback function (or record/playback function) which plays back information recorded on an optical disc such as a music CD, CD-ROM, CD-R, CD-RW, DVD or the like, and is provided in the body of a computer apparatus (not shown in the drawings) such as a personal computer, for example.

As shown in FIG. 1 to FIG. 5, the disc drive 1 is equipped with an main body 2, a disc tray 11 which is adapted to receive an optical disc (not shown in the drawings) and which is movable in the forward and backward directions (horizontal direction) with respect to the main body 2, and a sled mechanism unit (disc device unit) 3 provided inside the main body 2. A detailed description of the structure of each element is given below.

The main body 2 includes a frame 21, a casing 22 which covers the bottom portion and side portions of the frame 21, and a top plate (cover) 23 which covers the top portion of the frame 21.

The frame 21 is provided with the disc tray 11 and a drive mechanism thereof (not shown in the drawings), the sled mechanism unit 3, and a main circuit substrate 12 and the like.

The casing 22 is fixed to the frame 21 by screws, for example, and the bottom portion of the frame 21 is covered by a bottom plate 221 of the casing 22. Further, the top plate 23 is fixed to the top portion of the frame 21 by screws, for example, and a space for receiving the disc tray 11 is formed between the frame 21 and the top plate 23.

Further, both the frame 21 and the disc tray 11 are formed from a resin material (plastic). Further, both the casing 22 and the top plate 23 are formed from plate-shaped members having predetermined shapes by carrying out press forming or the like on metal plates.

The main circuit substrate 12 has a circuit formed therein for controlling all operations of the disc drive 1, and also includes an interface connector for making a connection with the computer, various integrated ICs such as a microprocessor, a memory, a motor driver and the like, and various electronic components such as resistors, capacitors, switches and the like. As shown in FIG. 3 and FIG. 4, the main circuit substrate 12 is provided on the underside of the sled mechanism unit 3 (chassis 4) described below.

The disc tray 11 has a shallow concave disc support portion 111, and an optical disc (not shown in the drawings) is conveyed in a state where it is placed in this disc support portion 111.

The disc tray 11 is driven by a driving mechanism (not shown in the drawings) provided on the frame 21, and moves (slides) in the forward and backward directions with respect to the main body 2. Namely, the disc tray 11 is movable between a position for loading an optical disc in the main body 2 (hereafter referred to simply as the "loading position" or "loading state") and a position for ejecting the optical disc (hereafter referred to simply as the "ejection positions" or "ejection state"). When the disc tray 11 is at the loading position (the state shown in FIG. 4), all of the disc tray 11 is housed inside the main body 2, and when the disc tray 11 is at the ejection position (the state shown in FIG. 3), a major portion of the disc tray 11 is in an ejected (protruding) state outside the front end of the main body 2.

As shown in FIG. 2 to FIG. 4, a frame member 13 which supports the sled mechanism unit 3 is provided inside the main body 2. The frame member 13 has a roughly rectangular shape, and a protruding shaft 131 is formed on both sides of the rear end portion of the frame member 13, respectively. The shafts 131 are supported in receiving portions formed in the frame 21 for enabling pivotal movement. In this way, the frame member 13 can pivot around the shafts 131 with respect to the main body 2.

When driven by a loading mechanism not shown in the drawings, the frame member 13 is pivotally displaced between a posture roughly parallel with the top plate 23 and the bottom plate 221 in the loading state (see FIG. 4) and a posture in which the front end is displaced downward to be inclined with respect to the top plate 23 and the bottom plate 221 in the ejection state (see FIG. 3).

A protruding stopper (protrusion) 132 is formed on the underside surface of the front end portion of the frame member 13. As shown in FIG. 3, when the front end of the frame member 13 is lowered in the ejection state, the stopper 132 makes contact with (or is close to) the bottom portion (bottom plate 221), and this prevents the frame member 13 from being lowered below this state.

The sled mechanism unit 3 is positioned inside the frame member 13. The sled mechanism unit 3 is supported on the frame member 13 via four rubber bushings (elastic members) 14 which absorb vibration (see FIG. 2).

Figure 5:
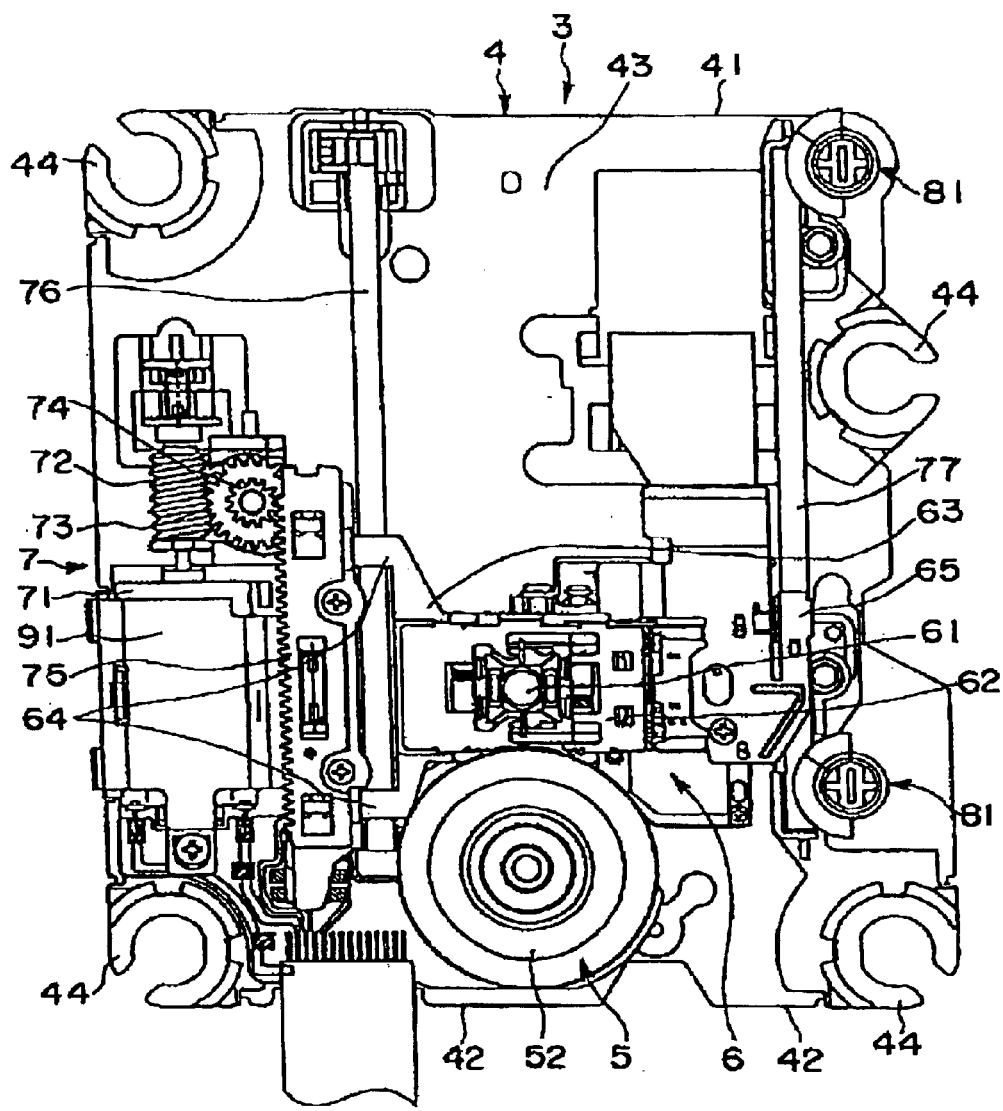
FIG. 5 is a plan view of a sled mechanism unit provided in the disc drive shown in FIG. 1.

As shown in FIG. 5, the sled mechanism unit 3 is mainly constructed from the chassis 4 and the optical disc rotational drive mechanism 5, the optical pick-up (optical head) 6 and the optical pick-up moving mechanism 7, and they are provided (mounted) on the chassis 4.

The optical disc rotational drive mechanism 5 includes a spindle motor 51 and a turntable 52 fixed to the rotor of the spindle motor 51. The optical disc rotational drive mechanism 5 rotationally drives an optical disc placed (placed) on the turntable 52.

The optical pick-up 6 is equipped with an objective lens 61, an actuator 62 which drives the objective lens 61 in the optical axis direction (focusing direction) and a radial direction (tracking direction) of the optical disc, a laser light source, a light-converging optical system, a beam splitter (or half mirror), a light-receiving element for detecting information and for detecting focusing signals and tracking signals, and a pick-up base (support member) 63 which supports these elements. In this structure, the reflected light of the laser light shining on the recording surface of an optical disc is guided to the light-receiving element via the objective lens, the beam splitter (or half mirror) and the like.

In the loading state, the objective lens 61 is exposed to the disc receiving portion 11 and faces the recording surface of the optical disc through an opening 112 formed in the disc tray 11.

The pick-up base 63 is constructed from a metal material manufactured by die casting, for example. A pair of sliding portions 64 formed with holes through which a guide shaft 76 is inserted are formed on the left side of the pick-up base 63 in FIG. 5. Further, a sliding portion 65 which engages with and slides on a guide shaft 77 is formed on the right side of the support member 63 in FIG. 5.

The optical pick-up moving mechanism 7 is constructed from a forward/reverse rotatable sled motor 71, a worm 72 fixed to the rotation shaft of the sled motor 71, a large-diameter gear 73 which meshes with the worm 72, a small-diameter gear 74 which is fixed to the large-diameter gear 73 to rotate on the same shaft, a rack gear 75 which is fixed to the pick-up base 63 to mesh with the small-diameter gear 74, and the pair of guide shafts 76 and 77 which define a moving path of the pick-up base 63 along which the optical pick-up is guided.

When the sled motor 71 is driven, the torque thereof is transmitted sequentially to the worm 72, the large-diameter gear 73, the small-diameter gear 74 and the rack gear 75, whereby the pick-up base 13 is moved along the guide shafts 76, 77 in a radial direction of the optical disc within a prescribed moving range. In this case, depending on the rotational direction of the sled motor 71, the pick-up base 63 moves in a direction approaching the center of rotation of the optical disc or in a direction moving away from the center of rotation.

The chassis 4 (sled mechanism unit 3) can be pivotally displaced with respect to both the frame member 13 and the main body 2. As shown in FIG. 3, the shafts 131 which function as a pivotal axis are positioned near the rear end (one end) of the chassis 4. Namely, the rear end of the chassis 4 forms the center of pivotal motion, and therefore forms a rotation end 41 which undergoes almost no displacement with respect to the main body 2, and the front end (other end) of the chassis 4 forms a displacement end 42 which is displaced roughly in the upward and downward directions with respect to the main body 2.

In accordance with this structure, when the chassis 4 (sled mechanism unit 3) is in the loading state, the displacement end 42 is at a raised position (hereafter referred to simply as the "raised position") (see FIG. 4), and when the chassis 4 is in the ejection state, the displacement end 42 is at a lowered position (hereafter referred to simply as the "lowered position") (see FIG. 3).

At the raised position, the chassis 4 forms a posture roughly parallel to the top plate 23 and the bottom plate 221, and at the lowered position, the chassis 4 forms a posture inclined with respect to the top plate 23 and the bottom plate 221.

When the chassis 4 is at the raised position, the turntable 52 is protruded to the inside of the disc receiving portion 111 through the opening 112, and in this way, the optical disc loaded inside the main body 2 is placed on the turntable 52. In this state, a disc clamper 15 which is rotatably provided on the inside of the top plate 23 is attracted to a magnet provided in the turntable 52, whereby the optical disc is held between the turntable 52 and the disc clamper 15 (see FIG. 4).

When the chassis 4 is at the lowered position, the turntable 52 and a portion of the optical pick-up 6 and the like are positioned so as to not interfere with the disc tray 11 being moved toward the ejection position (see FIG. 3).

Figure 6:
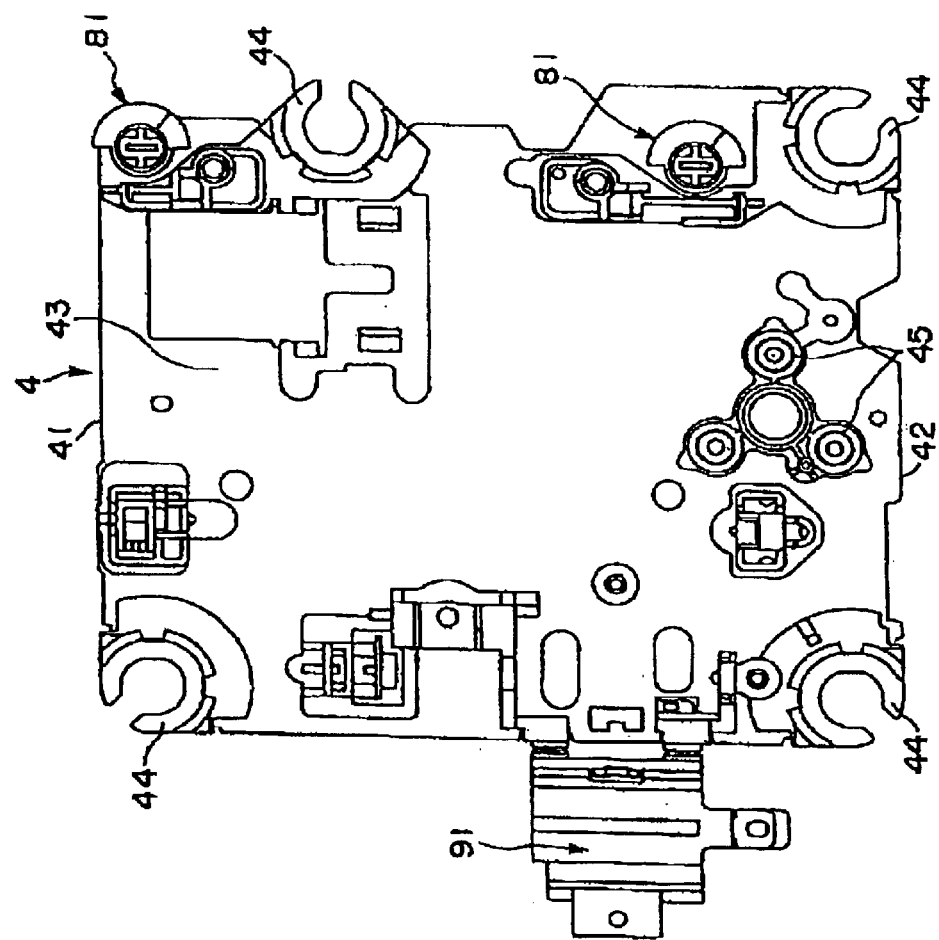
FIG. 6 is a plan view of a chassis before mounting an optical disc rotational drive mechanism, an optical pickup, an optical pickup moving mechanism and the like in the sled mechanism unit shown in FIG. 5.
Figure 7:
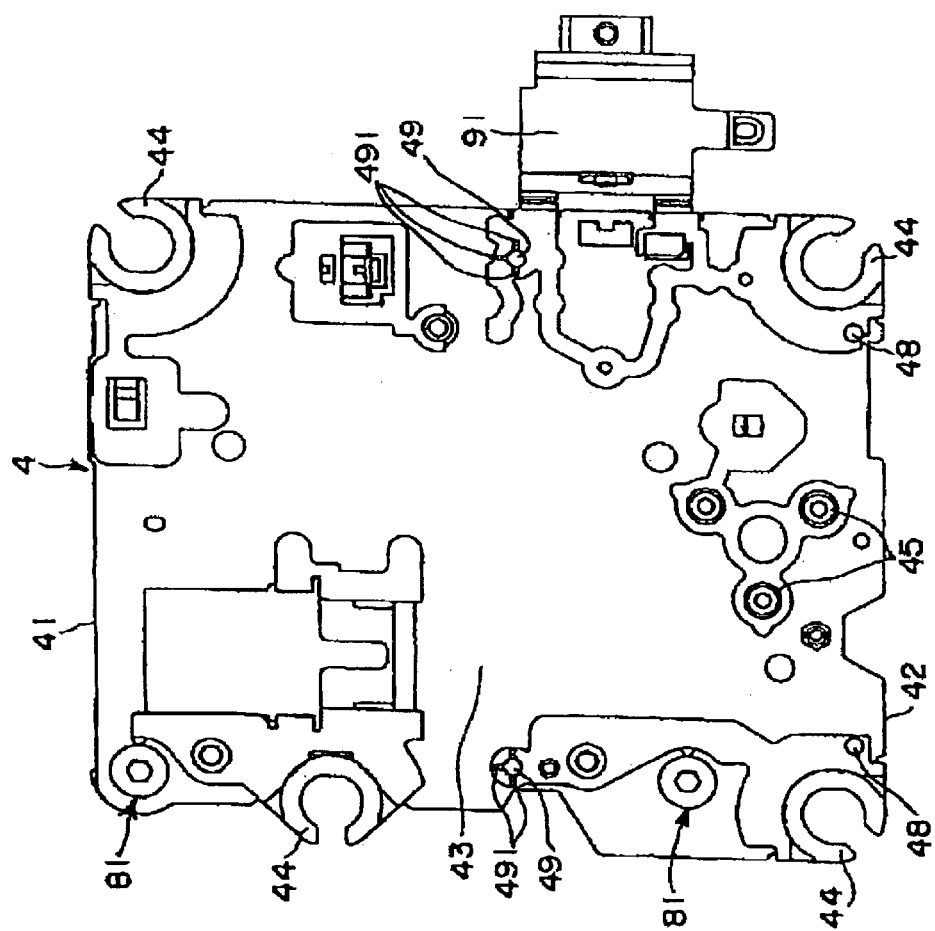
FIG. 7 is a bottom view of the chassis shown in FIG. 6.
Figure 8:
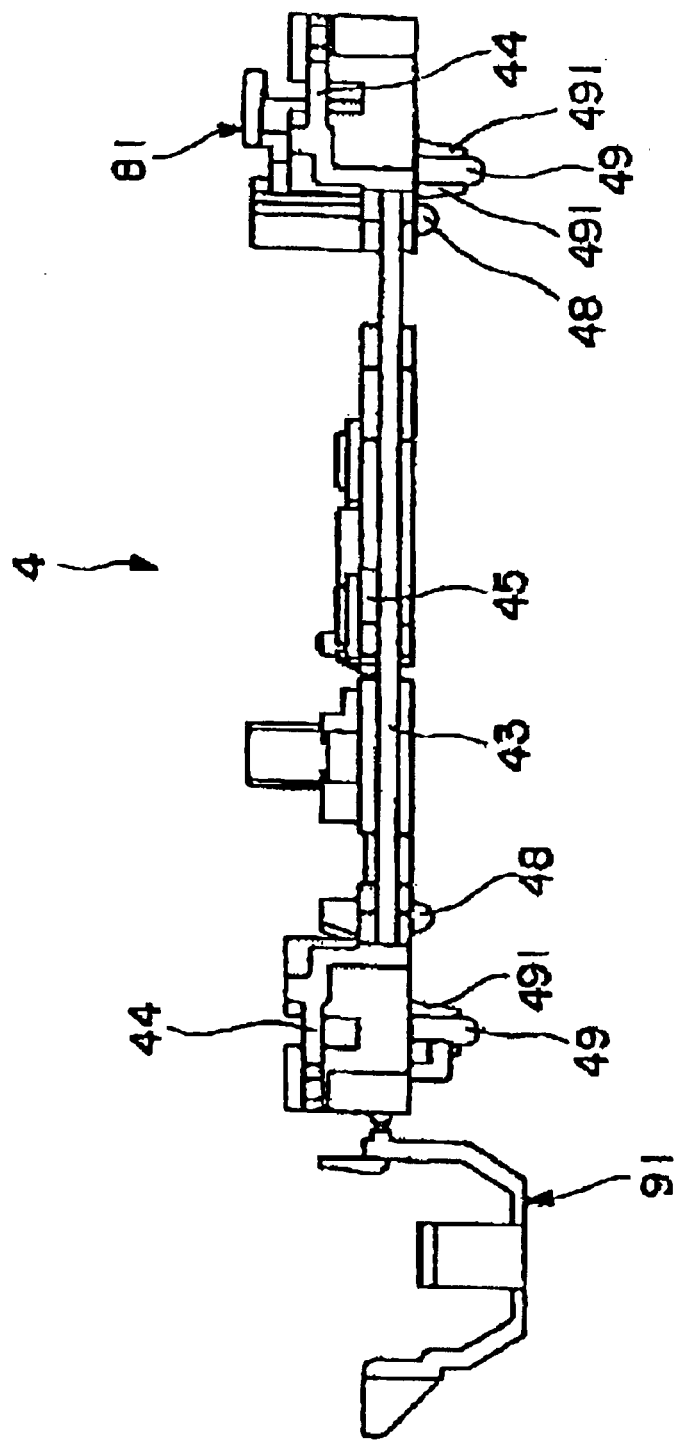
FIG. 8 is a front view of the chassis shown in FIG. 6.

As shown in FIG. 6 to FIG. 8, the chassis 4 includes a flat plate-shaped chassis base 43. The chassis base 43 has a roughly rectangular shape, and is constructed from a metal material such as stainless steel or the like, for example. The chassis base 43 is provided (equipped) with various elements such as rubber bushing mounting portions 44 for mounting the rubber bushings 14, a spindle motor fixing portion 45 for fixing the spindle motor 51, an adjustment member 81 which adjusts the height of the guide shaft 77, a holder member 91 which houses and holds the sled motor 71, and the like.

The rubber bushing mounting portions 44, the spindle motor fixing portion 45, the adjustment member 81, the holder member 91 and the like are constructed from a synthetic resin material, and these members can be formed on the chassis base 43 at the same time (one time) by outsert molding. There is no particular limitation to the synthetic resin material, and it is possible to use polyacetal, polybutylene terephthalate, polyphenylene sulfide and the like.

In this regard, "outsert molding" refers to a method of providing (forming) functional parts on a base plate at one time by inserting the base plate made of metal, synthetic resin or the like between molding dies, and carrying out a single injection molding to form the functional parts on the base plate integrally at one time.

In the chassis 4, the chassis base 43 is a low-cost element having high rigidity and superior dimensional stability. The various members having the complex shapes described above are provided on the chassis base 43 by a single injection molding carried out by outsert molding described above. This makes it possible to achieve a reasonable reduction in cost with utilizing the characteristics of both the metal material and the synthetic resin material.

In the descriptions given below, the members or parts provided on the chassis base 43 by outsert molding are referred to as "outsert molded members or parts".

Figure 9:
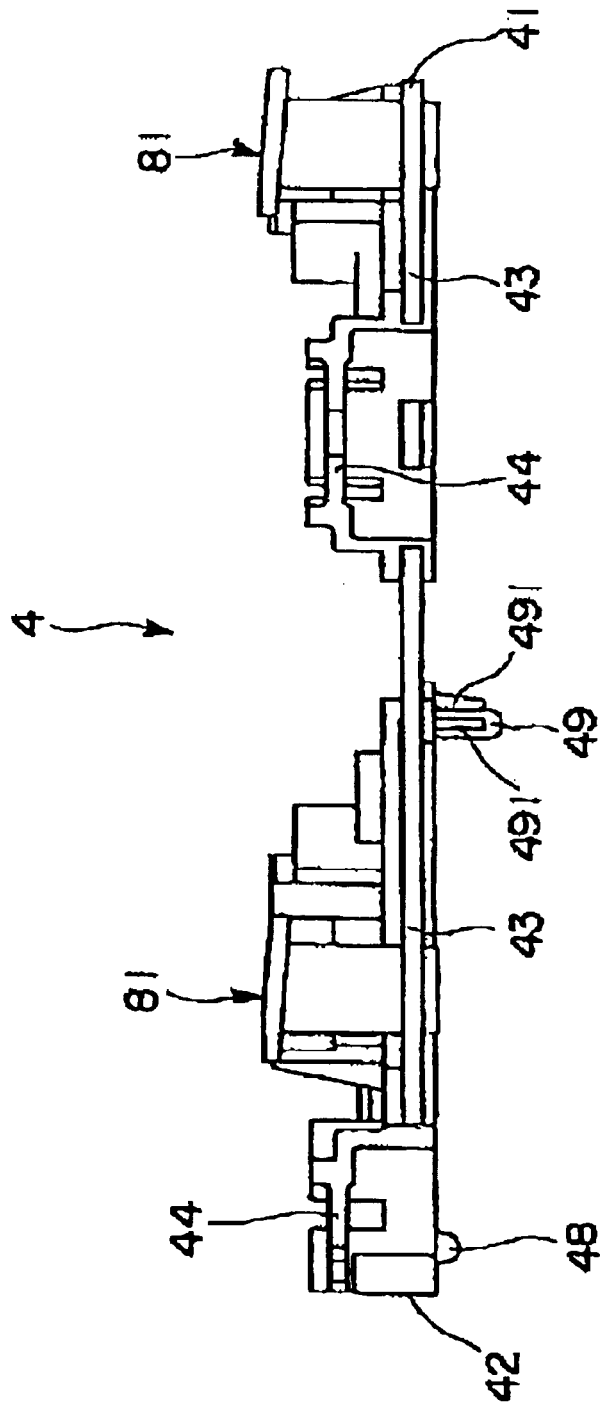
FIG. 9 is a right side view of the chassis shown in FIG. 6.

Now, as shown in FIG. 9, first stoppers (first protrusions) 48 and second stoppers (second protrusions) 49 are formed on the underside of the chassis 4 to protrude downward. The first stoppers 48 are positioned near the displacement end 42, and the second stoppers 49 are positioned at an intermediate portion between the rotation end 41 and the displacement end 42. The bottom end portions of the first stoppers 48 and the second stoppers 49 have rounded shapes.

As shown in FIG. 7, the first stoppers 48 and the second stoppers 49 are provided as pairs on both sides of the chassis 4.

As shown in FIG. 3, when the chassis 4 is at the lowered position, both the first stoppers 48 and the second stoppers 49 make contact with (or are close to) the bottom portion (bottom plate 221) of the main body 2.

The second stoppers 49 are positioned roughly in the center between the rotation end 41 and the displacement end 42. Further, the main circuit substrate 12 is positioned on the underside of the chassis 4 at a position near the rotation end 41 (at the right side of FIG. 3) away from the second stoppers 49.

As shown in FIG. 9, the length of the second stoppers 49 is longer than the length of the first stoppers 48. By providing this difference in length of the first stoppers 48 and the second stoppers 49, when the chassis 4 is inclined at the lowered position, both the first stoppers 48 and the second stoppers 49 make contact with (or are close to) the bottom plate 221.

As shown in FIG. 8, plate-shaped ribs 491 are formed on peripheral portion of each second stopper 49, and in this way, the second stoppers 49 have sufficient strength even though it is made relatively long. In the structure shown in the drawings, three ribs 491 are formed on each second stopper 49.

In accordance with this structure, in the case where a downward force (shock force) acts on the sled mechanism unit 3 when the disc drive 1 is in the ejection state shown in FIG. 3 due to a shock such as the dropping of the disc drive 1 or the like (hereafter referred to simply as the "shock time"), the first stoppers 48 make contact with the bottom plate 221, and this prevents the displacement end 42 of the chassis 4 from being lowered with respect to the main body 2. In this way, it is possible to reliably prevent damage to the various portions of the sled mechanism unit 3 caused by the displacement end 42 colliding with the bottom plate 21. Further, it is also possible to prevent the displacement end 42 from being interfering or colliding with adjacent elements or parts to damage (breakage) them.

In contrast with the disc drive of the present invention described above, in a conventional disc drive which do not have any equivalent parts or portions like to second stoppers 49 of the present invention, at the shock time, the center portion of the chassis 4 and the rotation end 41 are liable to be lowered with respect to the frame member 13 due to the deformation (bending) of the rubber bushings 14. Therefore, in the disc drive having such a structure, there is risk that collision with the other elements including the main circuit substrate 12 will cause damage to such elements.

Further, in the present embodiment, the first stoppers 48 and the second stoppers 49 are constructed by outsert molded members or parts. Accordingly, the first stoppers 48 and the second stoppers 49 do not require the front-end cost and manufacturing cost for separate manufacturing, and there is no need to assemble them to the chassis base 43. In this way, it is possible to avoid increasing the manufacturing cost of the disc drive 1.

Further, the first stopper 48 and the second stopper 49 in the left side of FIG. 7 are integrally formed on the same (one) outsert molded member, and in the same manner, the first stopper 48 and the second stopper 49 in the right side of FIG. 7 are also integrally formed on the same (one) outsert molded member. In this way, the positions of the provisions of the first stoppers 48 and the second stoppers 49 can be made highly accurate, and when the chassis 4 is at the lowered position, the contact of the first stoppers 48 and the second stoppers 49 with the bottom plate 221 can be secured more reliably.

Further, since the first stoppers 48 and the second stoppers 49 are formed of a resin material (in particular, a relatively soft resin for outsert molding described above), there is particularly superior shock absorbing properties, and the sled mechanism unit 3 can be protected more reliably.

Furthermore, in the present embodiment, a description was given for the case where the chassis 4 is formed using outsert molding, but the present invention is not limited to this, and it is possible to use various manufacturing methods to form a chassis having any desired shape. Further, it is also possible to provide the chassis 4 with other stoppers in addition to the first stoppers 48 and the second stoppers 49. Further, it is also possible to pivotally support the chassis 4 directly on the main body 2 without the use of the frame member 13.

The disc drive of the present invention was described using the embodiment shown in the drawings, but it should be noted that the present invention is not limited to such embodiment, and it is possible to replace the structural elements of the above-described disc drive with any other structural elements that exhibit the same functions. Further, various other structural elements may be added to the embodiment described above.

As described above, in the case where a shock acts on the disc drive when the disc tray is in the ejection state, the present invention makes it possible to reliably prevent the chassis provided with the optical disc rotational drive mechanism or the like from interfering or colliding with other elements of the disc drive. Accordingly, the present invention makes it possible to reliably prevent such other elements of the disc drive from being damaged or broken.

What is claimed is:

1. A disc drive for playing back information recorded in an optical disc, comprising:

a main body having a bottom portion:

a disc tray which is movable with respect to the main body between a loading position for loading an optical disc and an eject position;

a chassis on which a rotational drive mechanism for rotating a loaded optical disc is provided, the chassis having front and rear ends and an undersurface, and the chassis being pivotally provided with respect to the main body about a pivotal axis near the rear end of the chassis so that the front end thereof can be displaced between a lowered position when the disc tray is ejected and a raised position for placing the optical disc on the rotational drive mechanism when rotating the optical disc; and first and second stopper means provided on the undersurface of the chassis so as to protrude therefrom, the first stopper means being arranged at a position near the front end of the chassis and the second stopper means being arranged at a position between the front end and the rear end of the chassis, and the first and second stopper means being adapted to make contact with the bottom portion of the main body when the chassis is in the lowered position.

2. The disc drive as claimed in claim 1, wherein the second stopper means is provided at a roughly middle position between the front and rear ends of the chassis.

3. The disc drive as claimed in claim 1, where each of the first and second stopper means includes a pair of stoppers.

4. The disc drive as claimed in claim 3, wherein the chassis includes a plate-shaped chassis base, and the first and second stoppers being formed with the chassis base by outsert molding.

5. The disc drive as claimed in claim 4, wherein one of the first stoppers and one of the second stoppers are integrally formed on one outsert molded member, and another of the first stoppers and another of the second stoppers are integrally formed on another outsert molded member.

6. The disc drive as claimed in claim 1, further comprising a main circuit substrate having a circuit for controlling various operations of the disc drive, the main circuit substrate being positioned on the underside of the chassis at a position near the rear end away from the second stopper means.

7. The disc drive as claimed in claim 1, further comprising a frame member provided in the main body so as to surround the outer periphery of the chassis, and the frame member being pivotally displaceable with respect to the main body, in which the chassis is supported by the frame member through elastic members.

8. The disc drive as claimed in claim 1, wherein the length of the second stopper means is longer than the length of the first stopper means.

* * * * *

UNITED STATES PATENT AND TRADEMARK OFFICE
CERTIFICATE OF CORRECTION

PATENT NO. : 6,912,723 B2
DATED : June 28, 2005
INVENTOR(S) : Yumitori et al.

It is certified that error appears in the above-identified patent and that said Letters Patent is hereby corrected as shown below:

Title page,
Item [54], Title, change "DISC DRIVE FOR PLAYING INFORMATION RECORDED ON AN OPTICAL DISC" to -- DISC DRIVE FOR PLAYING INFORMATION RECORDED IN AN OPTICAL DISC --.

Column 1,
Line 12, change "the like These disc drives" to -- the like. These disc drives --.
Line 62, change "there present invention" to -- the present invention --.

Column 2,
Line 11, change "fist stopper" to -- first stopper --.

Column 3,
Line 13, change "or the 'backward' and" to -- or the 'backward direction' and --.

Column 7,
Line 45, change "there is" to -- there are --.
Between lines 12 and 13, insert the following paragraph:
-- Further, at the time of shock, the second stoppers 49 also make contact with the bottom plate 221. This prevents the center portion of the chassis 4 and the rotation end 41 from being lowered with respect to the main body 2. In this way, the chassis 4 is prevented from interfering or colliding with other elements including the main circuit substrate 12, and this makes it possible to reliably prevent damage (breakage) to the other elements including the main circuit substrate 12 and the like. --.

Signed and Sealed this

Twenty-ninth Day of November, 2005

JON W. DUDAS
*Director of the United States Patent and Trademark Office*